2,800,473

METHOD OF MAKING 6-MERCAPTOPURINE

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application September 12, 1955, Serial No. 533,885

7 Claims. (Cl. 260—252)

This invention relates to a novel method for the manufacture of compounds of the purine type, particularly mercapto purine, and has as an object the production of these derivatives in substantial yields.

The method adequate for preparing mercaptopurines since the yields are sometimes low and the product is sometimes contaminated with starting material necessitating long and tedious purification. It has now been found that the process is greatly improved and facilitated when a basic solvent, which is relatively unreactive toward phosphorus pentasulfide, is employed. It is believed that the function of such a solvent is to increase the solubility of reactant and product and that the failure of the reaction to proceed to completion in an inert solvent may be due to the fact that the insoluble product coats the surface of the starting material in such a way as to prevent further reaction. However, the teachings of this invention are independent of any explanation of the mechanism.

Suitable bases for the purpose are those relatively inert toward the reagents entering into the reactions and preferably those boiling over 100°, allowing the reaction to proceed without the use of pressure equipment. Effectively, for example, amino-substituted aromatic compounds would be unsuitable because of their reactiveness under the conditions involved. Bases capable of operating effectively under the conditions involved include pyridines, picolines, lutidines, quinoline and perhaps isoquinoline. Although the suitability of any number of bases for the purpose is easily ascertained, the availability of pyridine makes this compound preferable in the ordinary practice of the invention. In general the heterocyclic bases may be preferred because they are sufficiently involatile, sufficiently basic and nonreactive toward the components of the reaction.

More particularly the method of the invention comprises the preparation of compounds of the formula:

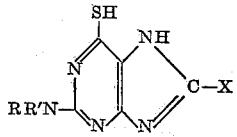

where R and R' are selected from the class consisting of H, lower alkyl and aryl radicals; RR'N is selected from the class consisting of cyclic amino radicals; R and R' together have no more than six carbon atoms; X is selected from the class consisting of H and the mercapto radical, by the reaction of a compound having the formula:

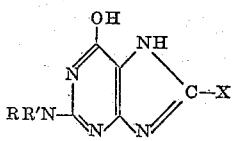

wherein X is selected from the class consisting of H and the hydroxyl radical, and RR'N has the indicated values with phosphorus pentasulfide in a basic solvent which is inert to the phosphorus pentasulfide.

The advantages of the present invention are improved yield, much greater ease of purification and greater convenience in manufacture due to the lower operating temperatures which can be used. The following examples are illustrative.

EXAMPLE 1

*2-amino-6-mercaptopurine*

A mixture of 20 g. of guanine, 100 g. of phosphorus pentasulfide and 500 ml. of pyridine was refluxed for six hours. The pyridine was removed under reduced pressure and the residue boiled with 500 ml. of water for 10 minutes. The pH was adjusted to 4 by the addition of concentrated hydrochloric acid and the mixture was chilled. The precipitate was filtered off, washed with water and dried at 100°. This precipitate was extracted four times with 200 ml. portions of concentrated ammonium hydroxide and the insoluble residue filtered off. The ammoniacal solution was evaporated to 500 ml. to remove some of the excess ammonia and the solution then acidified to pH 4 by the addition of concentrated hydrochloric acid. The precipitate of 2-amino-6-mercaptopurine (11.7 g.) was purified by solution in dilute ammonium hydroxide and precipitation at pH 4. The product has a characteristic ultraviolet absorption spectrum with maxima at 255 and 345 m$\mu$ at pH 1, and at 245, 270 and 322 m$\mu$ at pH 11.

EXAMPLE 2

A mixture of 1 g. of guanine, 3 g. of phosphorus pentasulfide and 50 ml. of quinoline was warmed to about 120° for 45 minutes and then at 175° for 30 minutes. After cooling slowly the solvent was decanted and the residue extracted with hot water and filtered. The solid was warmed with 8 N ammonium hydroxide and filtered. The filtrate was boiled until neutral during which time a dark granular precipitate was formed. This was removed by filtration and washed with methanol. The yield was 450 mg. of material possessing the ultraviolet absorption spectrum of 2-amino-6-mercaptopurine, as given above.

EXAMPLE 3

*2-dimethylamino-6-hydroxypurine*

A mixture of 30 g. of 2-methylmercapto-6-hydroxypurine and 100 ml. of a 25% solution of dimethylamine in methanol was heated in a sealed tube at 140° for 24 hours. The precipitate was filtered off and washed with methanol. The crude 2-dimethylamino-6-hydroxypurine (11 g.) was recrystallized from 1 liter of water and decolorized with Darco. The purified product (6.3 g.) showed an ultraviolet absorption spectrum with $\lambda$ max.=258, 290 (infl.) m$\mu$ at pH 1, and $\lambda$ max.=245, 280 m$\mu$ at pH 11.

EXAMPLE 4

*2-dimethylamino-6-mercaptopurine*

A mixture of 5.5 g. of 2-dimethylamino-6-hydroxypurine, 25 g. of phosphorus pentasulfide and 250 ml. of dry pyridine was heated under reflux conditions for 3 hours. The reaction mixture was evaporated to dryness under reduced pressure and the residue heated with 200 ml. of water for 20 minutes. After chilling, the solid residue was collected, washed with cold water and dried at 90°. The crude 2-dimethylamino-6-mercaptopurine (3.75 g.) was purified by recrystallization from water followed by solution in 2-N hydrochloric acid and re-precipitation by neutralization with ammonium hydroxide. The purified product showed an ultraviolet absorption spectrum with $\lambda$ max.=270 and 358 m$\mu$ at pH 1 and $\lambda$ max.=255, 383, 330 m$\mu$ at pH 11.

EXAMPLE 5

2-ethylamino-6-hydroxypurine

A mixture of 30 g. of 2-methylmercaptopurine-6-hydroxypurine and 100 ml. of 33% aqueous ethylamine was heated at 140° in a sealed tube for 24 hours. The small insoluble residue was filtered off and the filtrate concentrated to 50 ml. under reduced pressure. The solution was adjusted to pH 5-6 with acetic acid and the precipitate of 2-ethylamino-6-hydroxypurine collected. After two recrystallizations from hot water, the product (5.7 g.) showed an ultraviolet absorption spectrum with λ max.=252, 275 (infl.) m$\mu$ at pH 1 and λ max.=250, 275 m$\mu$ at pH 11.

EXAMPLE 6

2-ethylamino-6-mercaptopurine

A mixture of 5.6 g. 2-ethylamino-6-hydroxypurine, 30 g. of phosphorus pentasulfide and 250 ml. of pyridine was heated under reflux conditions for 4 hours. The mixture was taken to dryness under reduced pressure, and the residue was heated with 100 ml. of water for 15 minutes. The solution was chilled and 150 ml. of concentrated ammonium hydroxide added. After further chilling the precipitate of ammonium phosphate was filtered off and the ammoniacal filtrate taken down to 25 ml. under reduced pressure. Upon chilling, 2-ethylamino-6-mercaptopurine (2.5 g.) separated out and was collected. The product has an ultraviolet absorption spectrum with λ max.=262 and 350 m$\mu$ at pH 1 and λ max.=250, 325 m$\mu$ at pH 11.

EXAMPLE 7

2-analino-6-hydroxypurine

A mixture of 30 g. of 2-methylmercapto-6-hydroxypurine and 53 ml. of aniline was heated at 160° for 48 hours. The reaction mixture was diluted with 200 ml. of absolute alcohol and the insoluble residue filtered off. This residue was then leached with 200 ml. of ether and dried at room temperature. The crude 2-anilino-6-hydroxypurine was isolated as its hydrochloride (25.1 g.) by boiling with 1200 ml. of 1-N hydrochloric acid, filtering and chilling. The hydrochloride was suspended in 500 ml. of hot water and the theoretical amount of sodium hydroxide added to neutralize the hydrochloric acid. The free 2-anilino-6-hydroxypurine (19.5 g) was collected after chilling. It has an ultraviolet absorption spectrum with λ max.=270 m$\mu$ at pH 1 and λ max.=240, 275 m$\mu$ at pH 11.

EXAMPLE 8

2-anilino-6-mercaptopurine

A mixture of 10 g. of 2-anilino-6-hydroxypurine, 50 g. of ground phosphorus pentasulfide and 200 ml. of dry pyridine was heated under reflux conditions for 5 hours. The reaction mixture was worked up essentially as in Example 4. For final purification, the product was dissolved in 10 parts of dimethyl formamide, the insoluble residue removed by filtration and the 2-anilino-6-mercaptopurine precipitated by the addition of 10 volumes of water for every volume of dimethyl formamide. The product has an ultraviolet absorption spectrum with λ max.=280, 352 m$\mu$ at pH 1 and λ max.=285, 327 m$\mu$ at pH 11.

EXAMPLE 9

2-piperidino-6-hydroxypurine

A mixture of 30 g. of 2-methylmercapto-6-hydroxypurine, 65 ml. of piperidine and 27.5 ml. of concentrated hydrochloric acid was heated at 140° in a sealed vessel for 24 hours. The reaction mixture was diluted with 50 ml. of water and filtered to remove a small residue. The solution was adjusted to pH 5 with hydrochloric acid and chilled. The precipitate, which contained mainly starting material, was filtered off. The filtrate was taken to dryness under reduced pressure and the residue treated with 100 ml. of 6-N hydrochloric acid and 150 ml. of acetone. The 2-piperidino-6-hydroxypurine precipitated at its hydrochloride (5.5 g.). It was obtained as the free base by solution in water and neutralization with ammonium hydroxide. The product has an ultraviolet absorption spectrum with λ max.=260 m$\mu$ at pH 1 and λ max.=255, 290 (infll.) at pH 11.

EXAMPLE 10

2-piperidino-6-mercaptopurine

A mixture of 7 g. of 2-piperidino-6-hydroxypurine, 50 g. of powdered phosphorus pentasulfide and 500 ml. dry pyridine was heated under reflux conditions for 3 hours. The reaction mixture was worked up as described in Example 4. The 2-piperidino-6-mercaptopurine (4.1 g.) was purified by solution in dilute ammonium hydroxide and precipitation at pH 5 with acetic acid. The product has an ultraviolet absorption spectrum with λ max.=272, 358 m$\mu$ at pH 1 and λ max.=255, 280, 328 m$\mu$ at pH 11.

EXAMPLE 11

2-dimethylamino-6-mercaptopurine

A mixture of 15 g. of 2-methylmercapto-6-hydroxypurine and 30 ml. of 30% methanolic dimethylamine was heated at 140° for 24 hours in a sealed tube. The mixture was taken to dryness under reduced pressure. The residue was dissolved in 120 ml. of boiling 1-N hydrochloric acid filtered hot to remove an insoluble residue. The filtrate was adjusted to pH 6 with ammonium hydroxide. After chilling, the 2-dimethylamino-6-hydroxypurine (8.5 g.) was filtered off, washed with water and dried at 110.

A mixture of 5 g. of 2-dimethylamino-6-hydroxypurine, 25 g. of phosphorus pentasulfide and 250 ml. of dry pyridine was refluxed for three hours. The excess pyridine was removed by distillation under reduced pressure. The residue was boiled with 200 ml. of water for ½ hour then chilled. The precipitate of crude 2-dimethylamino-6-mercaptopurine was filtered off and washed with water. It was purified by solution in 200 ml. of dilute ammonium hydroxide, filtration and acidification to pH 5 with hydrochloric acid. The yield of purified product was 2.5 g.

EXAMPLE 12

2-methylamino-6-mercaptopurine

Five grams of 2-methylmercapto-6-hydroxypurine and 20 ml. of 14% methanolic methylamine were heated in a sealed vessel at 140° at for 19 hours. The reaction mixture was taken to dryness in vacuo and the residue dissolved in 10 ml. of concentrated hydrochloric acid and 50 ml. of water. The solution was filtered and neutralized with ammonium hydroxide, whereupon 2-methylamino-6-hydroxypurine (2.7 g.) precipitated.

A mixture of 11.1 g. of 2-methylamino-6-hydroxypurine, 55 g. of powdered phosphorus pentasulfide and 500 ml. of dry pyridine were heated under reflux conditions for 3 hours. The pyridine was removed under reduced pressure and the residue heated with 350 ml. of water for 20 minutes. The mixture was chilled and 250 ml. of ammonium hydroxide added cautiously with cooling. After thorough chilling, the ammonium phosphate was filtered off and the filtrate taken down to 50 ml. under reduced pressure. The solution was adjusted to pH 5 and the precipitate (7 g.) of 2-methylamino-6-mercaptopurine filtered off. It has an ultraviolet absorption spectrum with λ max.=268, 358 m$\mu$ at pH 1 and λ max.=253, 282, 332 m$\mu$ at pH 11.

EXAMPLE 13

2-amino-6,8-dimercaptopurine

A mixture of 5 g. of 2-amino-6-hydroxy-8-mercaptopurine, 25 g. of powdered phosphorus pentasulfide and 200 ml. dry pyridine was heated under reflux conditions for 3 hours. The excess pyridine was removed under reduced pressure and the residue heated with 200 ml. of water for 15 minutes. The mixtuer was cooled, diluted with an equal volume of concentrated ammonium hydroxide and chilled. After filtration, the filtrate was taken down to a volume of 25 ml. under reduced pressure, adjusted to pH 5 with glacial acetic acid and the precipitate of 2-amino-6,8-dimercaptopurine collected. The product has an ultraviolet absorption spectrum with λ max.=270, 372 mμ at pH 1 and λ max.=250, 275, 348 mμ at pH 11.

This application is a continuation-in-part of our copending applications Serial No. 364,947, filed June 29, 1953, and Serial No. 375,819, filed August 21, 1953.

What we claim is:

1. A method for the preparation of compounds having the formula:

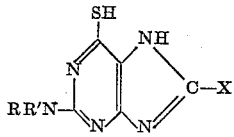

where R and R' are selected from the class consisting of H, lower alkyl and aryl radicals; RR'N is selected from the class consisting of cyclic amino radicals; R and R' together have no more than six carbon atoms; X is selected from the class consisting of H and the mercapto radical, by the reaction of a compound having the formula:

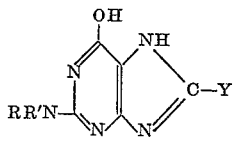

wherein Y is selected from the class consisting of H and the hydroxyl radical, and RR'N has the indicated values with phosphorus pentasulfide in a basic solvent which is inert to the phosphorus pentasulfide.

2. The method set forth in claim 1 wherein the basic solvent has a boiling point of over 100° C.

3. The method of claim 1 wherein the basic solvent is pyridine.

4. The method of claim 1 wherein the basic solvent is quinoline.

5. The method of preparing 2-amino-6-mercaptopurine in which guanine is treated with 2 to 5 parts by weight of phosphorus pentasulfide in 10 to 50 parts of pyridine at reflux temperature for 2 to 10 hours.

6. The method set forth in claim 1 wherein the reaction mixture is heated within a temperature range of about 100 to 200° C.

7. The method set forth in claim 1 wherein the basic solvent employed is selected from the group consisting of the pyridine and quinoline solvents.

No references cited.